United States Patent Office 2,738,346
Patented Mar. 13, 1956

2,738,346

METHOD FOR THE SEPARATION OF FLAVONOID COMPOUNDS

Simon H. Wender, Norman, Okla., and Clark H. Ice, Aiken, S. C., assignors to the United States of America as represented by the United States Atomic Energy Commission No Drawing. Application December 1, 1952, Serial No. 323,505

8 Claims. (Cl. 260—210)

Our invention relates to an improved method for the separation of flavonoid compounds and more particularly to the separation of closely related flavonoid compounds.

The flavonoid compounds comprise a very important class of plant pigments which are widely distributed in the vegetable kingdom. Interest is shown in a number of these compounds due to their vitamin-like action in increasing the resistance of blood capillaries to rupture. The term vitamin "P" is sometimes applied to flavonoids having this property. Rutin, a member of this class of pigments, enjoys widespread use as a drug for blood vessel treatment. In addition, it is anticipated that flavonoids will be of use in the control of radiation injury, and considerable experimental effort is being expended in this direction.

There is, therefore, considerable demand for such types of compounds for both practical and experimental purposes. Co-pending patent application S. N. 283,749, filed April 22, 1952, in the name of Simon H. Wender, which matured into Patent No. 2,681,907 on June 22, 1954, discloses a method for separating substantially pure flavonoid compounds in relatively concentrated form from extraneous organic and inorganic impurities. Co-pending patent application S. N. 285,046, filed May 12, 1952, in the names of Simon H. Wender, Thomas B. Gage, Clark H. Ice, and Quentin L. Morris discloses methods of separating general groups of flavonoid compounds from one another or individual compounds of different groups from one another. For example, flavonoid aglycones may be separated from flavonoid glycosides. However, the method is not sufficiently precise to permit separation of closely related compounds within the same family group.

Previous methods for the separation of flavonoid compounds within a single group include fractional crystallization and solven extraction techniques. The employment of these methods usually results in low yields, is cumbersome and tedious, and in many cases does not effect good separation of individual flavonoids.

An object of our invention, therefore, is to provide an improved method for the separation of flavonoid compounds.

Another object of our invention is to provide a method for the separation of closely related flavonoid compounds.

Still another object of our invention is to provide a method for the separation of individual flavonoid compounds in high yields.

Other objects and advantages of our invention will be apparent from the following description.

In accordance with our invention, a mixture of flavonoid compounds may be resolved into its individual components by passing an organic solution of said mixture through a bed of a comminuted hydrous metal silicate adsorbent, chromatographically eluting the resulting adsorbed compounds from said bed with an aqueous-organic solvent and separately collecting the resulting individual flavonoid compounds.

Using our invention, a mixture of flavonoid compounds may be rapidly separated in good yields into individual, relatively pure flavonoids. Our method does not require careful control or readjustment of conditions or the selection of different solvents and elutriants for each specific separation.

Table I, following, is illustrative, but by no means exclusive, of the flavonoid mixtures which may be separated into their individual components utilizing the method herein described.

TABLE I

Mixture 1:
   a. Quercitrin (3-rhamnoside of quercetin)
   b. Rutin (3-rutinoside of quercetin)
   c. Quercetin (3, 3', 4', 5, 7-pentahydroxyflavone)

Mixture 2:
   a. Xanthorhamnin (3-rhamninoside of rhamnetin)
   b. Quercitrin (3-rhamnoside of quercetin)
   c. Quercetin (3, 3', 4', 5, 7-pentahydroxyflavone)

Mixture 3:
   a. Xanthorhamnin (3-rhamninoside of rhamnetin)
   b. Rutin (3-rutinoside of quercetin)
   c. Quercetin (3, 3', 4', 5, 7-pentahydroxyflavone)

Mixture 4:
   a. Naringin (7-rhamnoglucoside of 4', 5, 7- trihydroxyflavone)
   b. Hesperidin (7-rhamnoglucoside of hesperitin)

Mixture 5:
   a. Morin (2', 3, 4', 5, 7-pentahydroxyflavone)
   b. Quercetin (3, 3', 4', 5, 7-pentahydroxyflavone)

Numerous organic solvents are suitable for dissolving the flavonoid mixture which is to be separated into its individual components by the method described herein. In general, any anhydrous, relatively low molecular weight, aliphatic organic solvent, such as, for example, ethanol, ethyl acetate, butanol, isopropyl alcohol, amyl alcohol, ethyl methyl ketone and acetone may be employed. In general, however, we prefer to employ acetone.

Many inorganic adsorbents are not suitable for use with our invention. However, we find that hydrous metal silicate adsorbents are unexpectedly satisfactory, and that hydrous magnesium silicate adsorbents are particularly satisfactory. One such hydrous magnesium silicate adsorbent is commercially available as "Magnesol," which is sold by the Food Machinery and Chemical Corporation, Westvaco Chemical Division, New York.

The quantity of adsorbent required for the optimum separation of the flavonoid mixture into individual components is, of course, dependent upon the amount and concentration of the feed solution. It is merely necessary that care be taken to supply enough adsorbent capacity to prevent break-through before the adsorption step is completed.

As is generally customary in adsorption chromatography separations, it is preferred to utilize the adsorbent in a comminuted form (about 40–100 mesh) and in a bed-like, columnar arrangement. Although not critical, we find it satisfactory to employ columns whose lengths are approximately four times to approximately six times their diameters.

The flavonoid mixture dissolved in the organic solvent may be adsorbed onto the column by simply passing the solvent solution through the column. The particular flow-rate selected is not critical, provided it is slow enough to prevent flavonoid break-through.

We find, in general, that at least partially water-miscible solvents selected from the herein above-described organic solvents, when saturated with water, or when mixed with water in the proper proportions, are suitable for chromatographically eluting the adsorbed flavonoid compounds from the hydrous metal silicate column, while the ethyl acetate-water system is greatly preferred. Since water-saturated ethyl acetate is greatly preferred, our specification will be further illustrated specifically with respect to this elutriant.

As used herein and in the appended claims, the term "aqueous-organic solvent," as applied to the elutriant, is intended to designate an at least partially water-miscible organic solvent containing readily measurable quantities of water. The optimum amount of water in each aqueous-organic solvent system may be easily determined by routine testing. However, when employing the ethyl acetate-water system, it is preferred to saturate the ethyl acetate with respect to water.

In a preferred embodiment of our invention, an anhydrous acetone solution containing about 1.0 gram of a flavonoid mixture is passed through a Pyrex column 18 millimeters in diameter and 80 millimeters in length which contains a wet-settled, comminuted hydrous magnesium silicate. The adsorbed flavonoids are then chromatographically eluted with an ethyl acetate solution saturated with water, and containing traces of acetic acid (approximately 0.1% to approximately 3% acetic acid, by volume, is satisfactory for this purpose), and the individual flavonoid compounds are separately collected.

The following specific example illustrates our invention in greater detail.

Example I

Six hundred milliliters of anhydrous acetone was added to 150 grams of "Magnesol" and the mixture stirred to give a thin slurry. The slurry was added at once to a Pyrex column, 60 millimeters in diameter and 160 millimeters in length, and the sides of the column were then rinsed down with 200 milliliters of acetone. An anhydrous acetone solution containing about 0.5 gram of a mixture of morin and quercetin (both flavonol aglycones) was passed through the column. After the solution had passed through the column, a filter paper circle was placed on top of the column, and an ethyl acetate solution saturated with water and containing traces of acetic acid was passed through the column until two individual bands, which were visible under ultraviolet light, passed down the column and were separately collected. Paper chromatography showed that the first fraction was pure quercetin while the second was pure morin.

In general, it may be said that the above example is merely illustrative and should not be construed as limiting the scope of our invention. Thus, since our process may be used to separate closely related flavonoid compounds, it has wide applicability to the separation of less closely related flavonoids. In this regard, we have found that our process is significantly superior to those previously employed for the separation of flavonoid compounds in different general groups. For example, our process may be used to substantially completely remove quercetin, a flavonol aglycone, from commercial rutin, a flavonol glycoside; to isolate pure isoquercetrin from grapes and from black currants; to separately recover quercetrin and quercetin from lemon flavin; and to resolve a flavonoid mixture separated from the leaves of *Vaccinium myrtillus* into its individual components. Therefore, the scope of our invention should be understood to be limited only as indicated by the appended claims.

What we claim is:

1. An improved method for the separation of flavonoid compounds, which comprises passing a solution of said compounds in a relatively low molecular weight, anhydrous aliphatic organic solvent through a bed of a comminuted hydrous magnesium silicate adsorbent, chromatographically eluting the resulting adsorbed compounds from said bed with an aqueous-relatively low molecular weight aliphatic organic solvent, and separately collecting the individual flavonoid compounds.

2. The method of claim 1 wherein the anhydrous relatively low molecular weight, aliphatic organic solvent is acetone.

3. The method of claim 1 wherein the aqueous-relatively low molecular weight aliphatic organic solvent is an aqueous solution of ethyl acetate.

4. The method of claim 3, wherein the aqueous solution of ethyl acetate is saturated with respect to water.

5. The method of claim 4 wherein the aqueous solution of ethyl acetate saturated with respect to water contains a small amount of acetic acid.

6. The method of claim 5 wherein the aqueous solution of ethyl acetate saturated with respect to water contains approximately 0.1% to approximately 3% acetic acid, by volume.

7. A method for the separation of flavonoid aglycones which comprises passing a solution of said aglycones in a relatively low molecular weight, anhydrous aliphatic organic solvent through a bed of comminuted hydrous magnesium silicate, chromatographically eluting the resulting adsorbed flavonoid aglycones from said bed with an aqueous-relatively low molecular weight aliphatic organic solvent, and separately collecting the individual flavonoid aglycones.

8. A method for the separation of flavonoid glycosides which comprises passing a solution of said glycosides in a relatively low molecular weight, anhydrous aliphatic organic solvent through a bed of comminuted hydrous magnesium silicate, chromatographically eluting the resulting adsorbed flavonoid glycosides from said bed with an aqueous-relatively low molecular weight aliphatic organic solvent, and separately collecting the individual flavonoid glycosides.

References Cited in the file of this patent

UNITED STATES PATENTS

| | | |
|---|---|---|
| 2,500,930 | Couch et al. | Mar. 21, 1950 |
| 2,520,127 | Couch et al. | Aug. 29, 1950 |
| 2,524,414 | Wolfrom et al. | Oct. 3, 1950 |

OTHER REFERENCES

Gage et al.: Science, 113, 522.

McNeely et al.: J. Am. Chem. Soc., 67, 527–9 (1945).

Wender et al.: "Science," Vol. 109 (1949), pages 287–289.

C. A. (1953), 5212 c.